Dec. 12, 1933.   C. R. BURROUGHS   1,938,997
TRANSMISSION
Filed Aug. 3, 1931   5 Sheets-Sheet 1
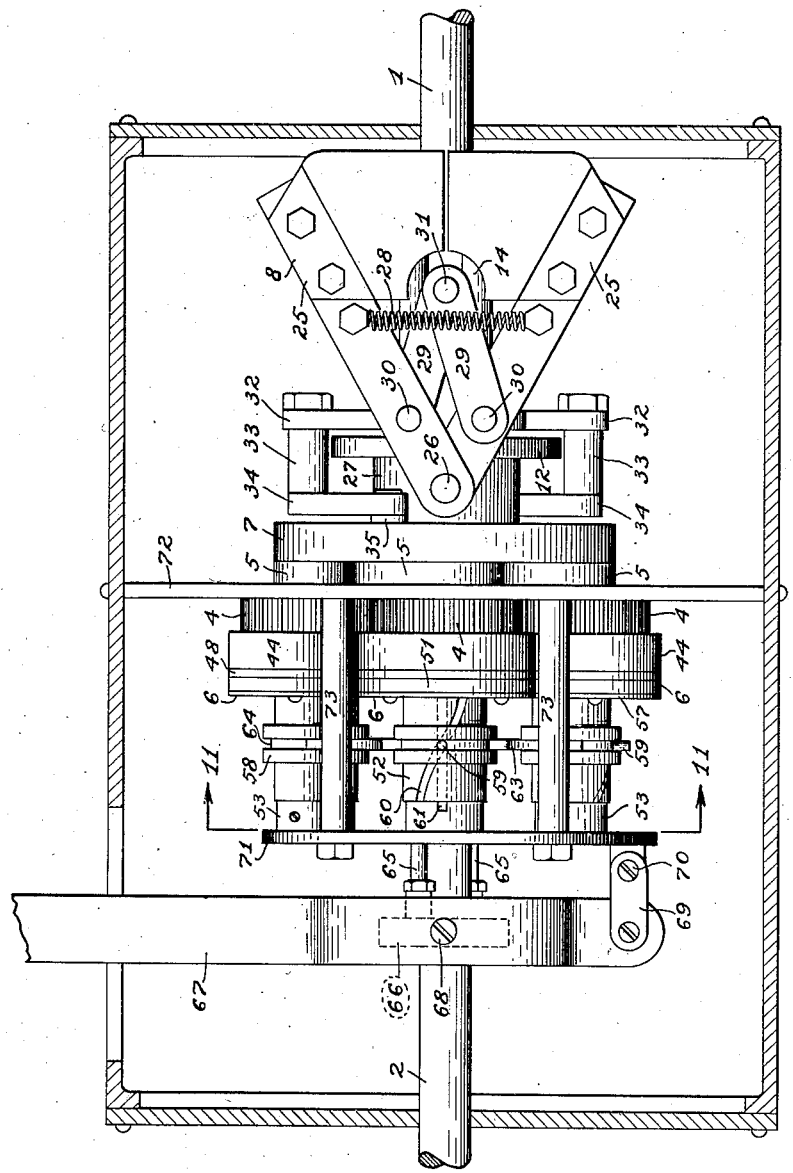
Fig-1-
INVENTOR.
CHARLES R. BURROUGHS
BY
Munn & Co
ATTORNEYS.

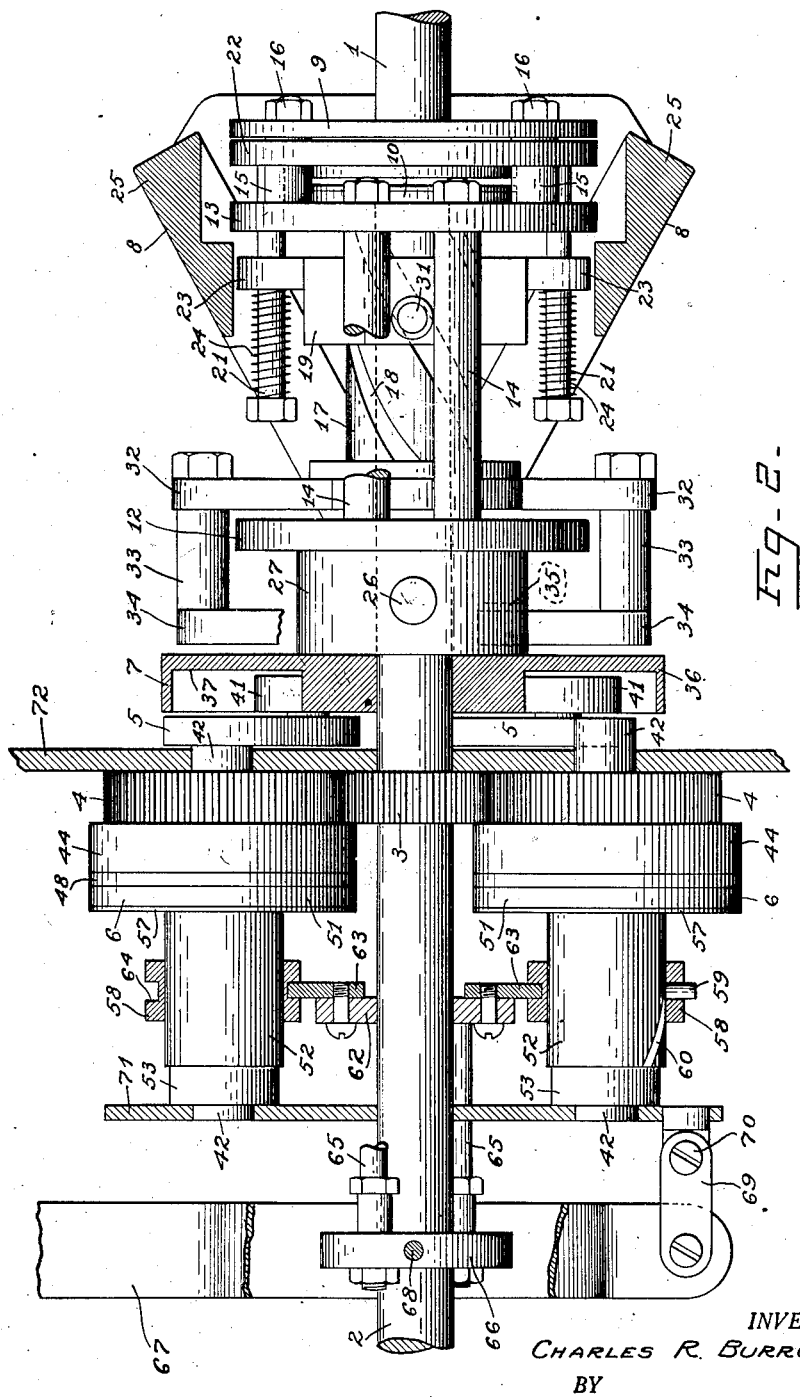

Dec. 12, 1933.  C. R. BURROUGHS  1,938,997
TRANSMISSION
Filed Aug. 3, 1931   5 Sheets-Sheet 3

INVENTOR.
CHARLES R. BURROUGHS.
BY
Munn & Co.
ATTORNEYS.

Dec. 12, 1933.                C. R. BURROUGHS                1,938,997
                                TRANSMISSION
             Filed Aug. 3, 1931                    5 Sheets-Sheet 4
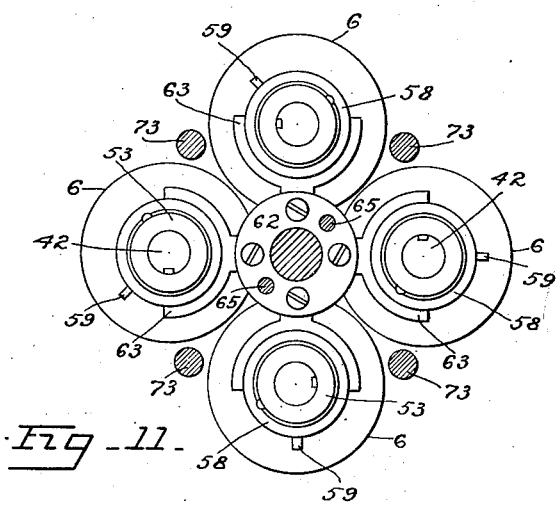
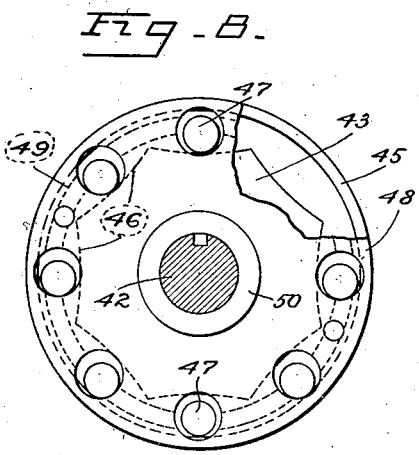
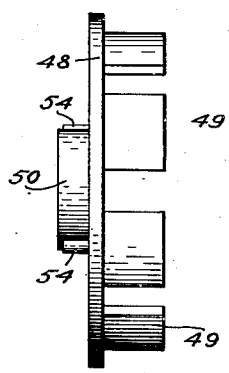
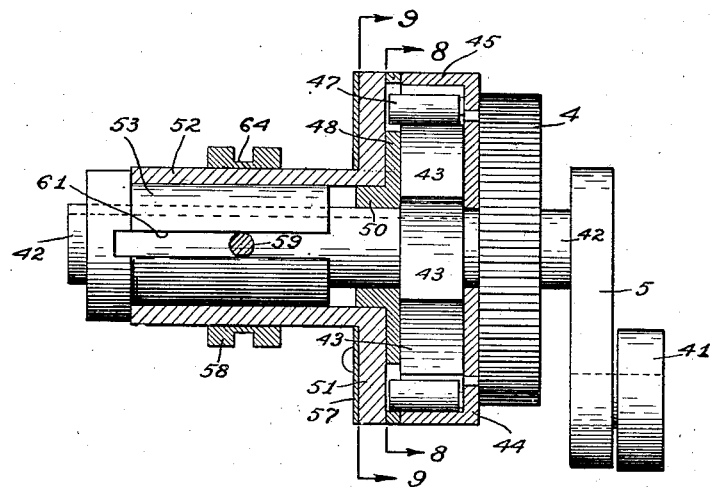
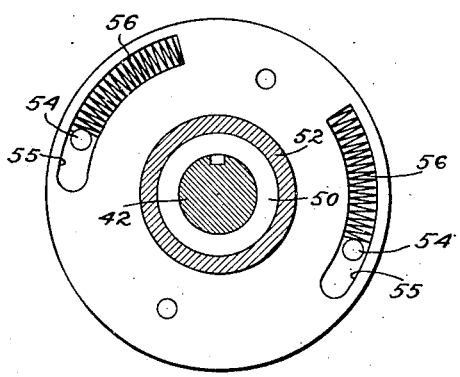
INVENTOR.
CHARLES R. BURROUGHS
BY
   Munn & Co.
        ATTORNEYS.

Dec. 12, 1933.　　　C. R. BURROUGHS　　　1,938,997
TRANSMISSION
Filed Aug. 3, 1931　　　5 Sheets-Sheet 5
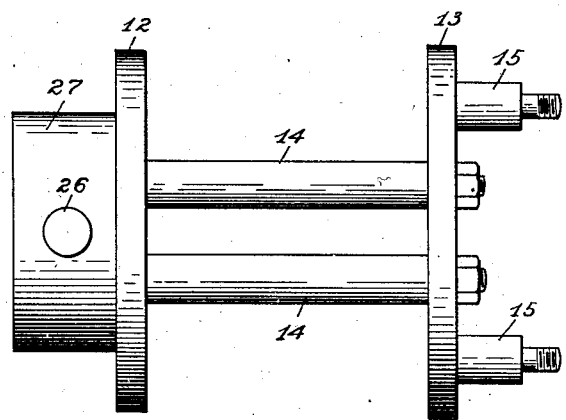
Fig. 12.
Fig. 14.
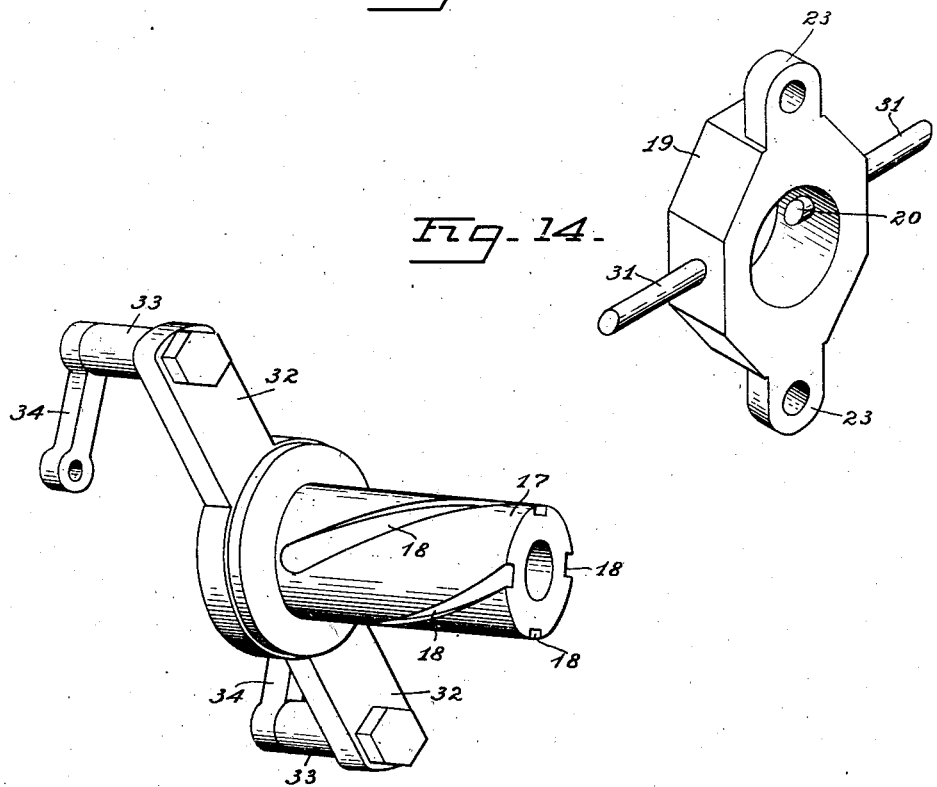
Fig. 13.
INVENTOR.
CHARLES R. BURROUGHS.
BY
Munn & Co.
ATTORNEYS.

Patented Dec. 12, 1933

1,938,997

UNITED STATES PATENT OFFICE 1,938,997

TRANSMISSION

Charles R. Burroughs, San Francisco, Calif.

Application August 3, 1931. Serial No. 554,883

6 Claims. (Cl. 74—54)

The present invention relates to improvements in a transmission particularly adapted for motor vehicles, and the principal object of the invention is to provide a transmission of the character described in which the manual control of the transmitting mechanism is much simplified as compared with transmissions in use at the present time.

More particularly one object of the invention is to provide a transmission in which gear shifting for the purpose of attaining different speeds is made unnecessary. A further object of the invention is to provide a transmission with an automatic control causing the same to automatically remain inactive at idling speeds of the engine, and to become active automatically when the engine speed is increased, whereby the provision of a clutch mechanism is obviated.

A further object of the invention is to provide a transmission with a so-called free wheeling effect in which the driven shaft is allowed to revolve in a desired direction independently of the drive shaft. A further object of the invention is to provide a transmission in which means are provided for automatically locking the driven shaft against reverse motion, whereby a motor vehicle climbing a hill is automatically prevented from reversing its movement in case the engine stops.

A further object of the invention is to arrange the transmission in such a manner that the speed of the vehicle is entirely controlled by the throttle valve without the use of any gear shifting or clutch mechanism.

Further objects and advantages of my invention will appear as the specification proceeds.

Figure 5:
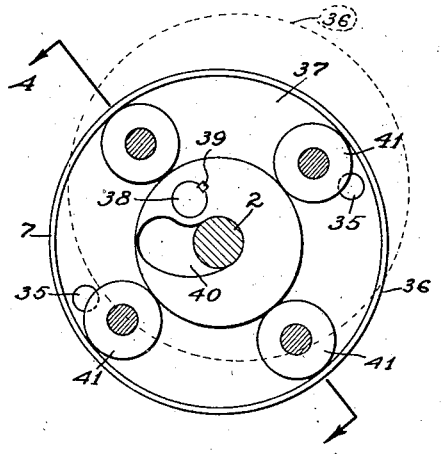
Figure 4:
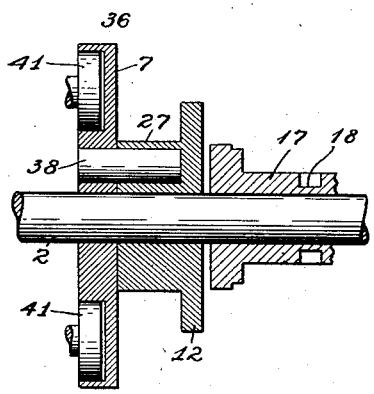
Figure 3:
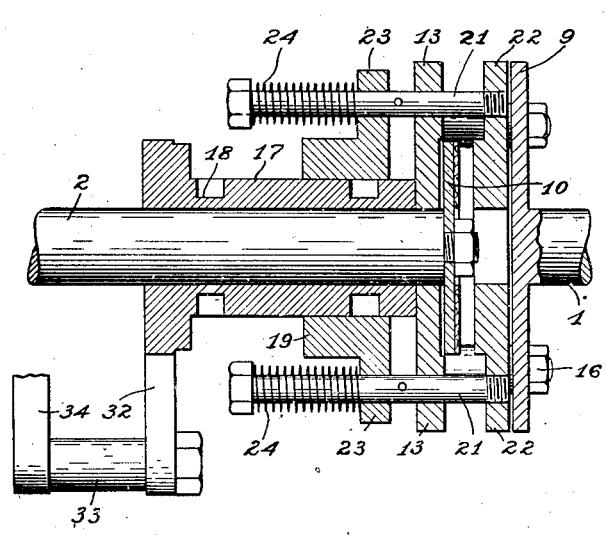
Figure 10:
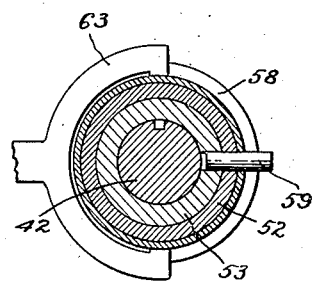

The preferred form of my invention is illustrated in the accompanying drawings, in which Figure 1 shows a side elevation of my transmission mechanism;

Figure 2 an enlarged side elevation with certain parts shown in section and other parts broken away to disclose the structural details of the mechanism;

Figure 3 a vertical section taken along line 3—3 of Figure 1, with certain parts omitted;

Figure 4 a section taken along line 4—4 of Figure 5;

Figure 5 a transverse section taken along line 5—5 of Figure 1;

Figure 6 a sectional detail view taken at line 6—6 of Figure 1;

Figure 7 a detail view of a cage used in my device;

Figure 8 a sectional detail view taken along line 8—8 of Figure 6;

Figure 9 a sectional detail view taken at line 9—9 of Figure 6;

Figure 10 a sectional detail view taken along line 10—10 of Figure 1;

Figure 11 a sectional view taken along line 11—11 of Figure 1;

Figure 12 a detail view of a cage used in my device;

Figure 13 a detail view of a cam operating sleeve, forming part of my invention; and Figure 14 a detail view of an operating nut for the sleeve.

While I have shown only the preferred form of the invention, it should be understood that various changes or modifications may be made within the scope of the claims hereto attached without departing from the spirit of the invention.

In its preferred form my invention comprises a drive shaft 1, a driven shaft 2 having a gear 3 thereon, a series of gears 4 surrounding the gear 3 and in mesh therewith, an oscillating arm 5 for each of the latter gears, means indicated at 6 for transmitting uni-directional motion from the oscillating arms to the gears in either direction, a shiftable cam 7 for oscillating the arms, means to be described later in detail for transmitting rotary motion from the drive shaft to the cam 7, and a governor control shown at 8 for positioning or shifting the cam relative to the axis of the shafts 1 and 2.

The drive shaft 1 terminates in a disc 9 and the driven shaft 2 has mounted on its adjacent end with freedom of rotary motion the assembly, including the cam 7, and except for a small disc 10 fixed to the shaft 2, the entire mechanism shown to the right of the cam 7 in Figure 2. This mechanism comprises a cage 11 shown in detail in Figure 12 and consisting of two discs 12 and 13, held in spaced and parallel relation by means of two pairs of rods 14. The right hand disc 13 is fixed in spaced relation to the disc 9 by means of posts 15 and nuts 16. The cage thus is made to turn in unison with the shaft 1. Between the two discs of the cage there is mounted on the shaft 2, with freedom of rotary motion, a sleeve 17, (shown in detail in Figure 13) and formed with spiral grooves 18. This sleeve has slidable thereon a nut 19 having inwardly extending lugs 20 riding in the grooves 18 of the sleeve. The nut 19 is held against rotary motion relative to the cage by means of pins 21 which are threaded into a disc 22 provided between the discs 13 and 9, and extend through perforations in the disc 13 and through lugs 23 projecting from the nut 19, a spring 24 on each pin 21 being placed under compression by the advance of the nut 19 for purposes to be mentioned hereinafter. The disc 22 is slidable on the posts 15.

The nut 19 is operated by means of the governor 8 comprising two weighted frames 25 pivoted to posts 26 projecting from a hub 27 extending from the disc 12 at diametrically opposite points, the two frames being drawn together by springs 28 and being thrown apart by centrifugal force. The two frames of the governor are connected to the nut by two sets of links 29 pivoted to the frames as at 30 and to posts 31 projecting from the nut. As the two frames of the governor are thrown apart by centrifugal force when the cage revolves with the drive shaft 1, the nut is advanced on the sleeve 17 and turns the latter relative to the cage.

The sleeve 17 has two lugs 32 extending therefrom radially in opposite directions and these lugs are connected through pins 33 with arms 34 pivoted to pins 35 projecting from the outer face of the cam 7 so that a turning movement of the sleeve 17 relative to the cage brings about a similar turning movement of the cam 7 relative to the cage.

The cam 7 is shown in detail in Figures 4 and 5, and comprises a disc 36 formed with an annular groove 37. This cam is pivotally secured to the hub 27 of the cage by means of an eccentric pin 38, the pin being keyed to the cam as shown at 39 and being revolvable in the hub 27. The disc 36 is formed with an arc-shaped slot 40 adapted to receive the driven shaft 2, and drawn on an arc having the pin 38 for a center. The slot is arranged in such a manner that when the shaft 2 occupies an end position in the slot as shown in Figure 5, the disc 36 is concentric with the shaft but the disc may be thrown from its concentric position into an eccentric position, (shown in dotted lines in Figure 5) when it is turned on the pin 38 by means of the arms 34, previously mentioned. It will thus be seen that on a slow turning movement of the shaft 1 comparable to idling speed of the engine of a motor vehicle, the governor will be inactive which causes the nut 19 and the sleeve 18 to remain inactive, and which causes the cam 7 to retain a concentric position relative to the shaft 2. As the speed of the shaft 1 is increased, the two frames of the governor begin to spread, urging the nut 19 forward and thereby turning the sleeve 18 relative to the cage, this turning movement resulting in a corresponding turning movement of the cam 7 on the pin 38, whereby the cam is thrown into an eccentric position, the amount of throw depending upon the speed of the shaft 1.

The groove 37 of the cam 7 is made to receive a plurality of rollers 41 disposed at the free ends of the arms 5 secured to shafts 42 arranged in parallel relation to the shaft 2 and supporting the gears 4 previously referred to. As long as the cam 7 occupies a concentric position relative to the shaft 2, no movement is imparted to the arms 5. But when the cam 7 is thrown from a concentric position into an eccentric position, the arms 5 are oscillated by the revolving cam, the length of stroke of the oscillations depending upon the position of the cam relative to the shaft 2. For transmitting the oscillating movement of the arms 5 and the shafts 42 to the gears 4, I provide the mechanism shown at 6 and illustrated in detail in Figure 6. The shaft 42 has a polygonal disc 43 fastened thereto, while the gear 4 has a disc 44 secured thereto, the latter disc having a peripheral flange 45 encircling the polygonal disc 43. The faces 46 of the polygonal disc are slightly dished as shown in Figure 8, and rollers 47 are interposed between the faces of the polygonal disc and the flange 45, the rollers being inactive when occupying a central position relative to the polygonal faces, and being active for transmitting movement from the disc to the flange 45 when urged toward one or the other of the edges of the polygonal disc.

For positioning the rollers I use the device illustrated in Figure 7 comprising a disc 48 having a plurality of prongs 49 projecting from one face thereof, the prongs being arranged to be received within the flange 45 and between the rollers 47 so that when the disc 48 occupies a central position the rollers 47 will be held centrally relative to the polygonal faces 46, and when the disc 48 is turned one way or the other the rollers will be correspondingly crowded toward one edge or the other.

The disc 48 is formed with a hub 50 loose on the shaft 42, and is yieldingly secured to the flange 51 of a sleeve 52 revolvably mounted on a second sleeve 53 fixed on the shaft 42. The disc 48 is fastened to the flange 51 by means of pins 54 extending into arc-shaped slots 55 of the flange 51 and actuated by springs 56 provided in the slots. A cover plate 57 holds the springs 56 in place. Each of the sleeves 52 has a collar 58 thereon, and these collars are provided with internal pins 59 adapted to ride in spiral grooves 60 in the sleeve 52 and in straight grooves 61 of the sleeve 53, so that when the collar is moved on the sleeve 52 from the central position shown in Figure 1, the sleeve 52 is turned either to the right or to the left, according to the direction of movement of the collar 58.

It will be seen, therefore, that when the collars 59 occupy a central or neutral position as shown in Figure 1 and Figure 6, the rollers 47 also occupy a central and neutral position as shown in Figure 8. But when the collars 58 are moved either forward or backward, such movement involves a turning motion of the sleeve 52 in one direction or the other, which movement is transmitted through one or the other of the springs 56 and the pins 54 to the disc 48 and the prongs 49, whereby the rollers 47 are yieldingly pushed into one or the other of the corners formed by the polygonal shape of the disc 43 for transmitting uni-directional motion from the oscillating disc 43 to the flange 45 and the gear 4 in one direction or the other.

The collars 58 may be actuated in any suitable manner as, for instance, by means of a ring 62 slidable on the shaft 2 and a plurality of forks 63 extending around the ring and engaging with grooves 64 in the collars 58. The ring 62 is connected through rods 65 with a second ring 66 which may be actuated in a conventional manner by means of a lever 67 pivoted thereto as at 68, and having one end fastened to a link 69 pivoted to a fixed support as at 70. Suitable bearing plates may be provided as at 71 and 72, and interconnected by posts 73, the bearing plates serving as supports for the shafts 2 and 42.

The operation of the device will be readily understood from the foregoing description. As the shaft 1 is made to revolve by the engine, the cage 11 is made to revolve with the shaft 1. As long as the shaft 1 revolves at idling speeds, the governor remains inactive and the cam 7 retains its concentric position relative to the shaft 2, and while it takes part in the rotary motion of the shaft 1, it does not actuate the arms 5 on account of its concentric position. As the speed of the shaft 1 increases, the two weighted frames of the governer spread apart causing the nut 19 to be pushed forward by the pin 31 and to turn the sleeve 17, whereby the cam 7, through the movement of the arms 32, the pins 33 and the arms 34, is turned on its pivot 38, see Figure 5, and thrown into an eccentric position. The eccentric cam now causes the arms 5 to oscillate. As long as the collars 58 occupy the central or neutral position shown in Figures 1 and 2, the oscillating movement of the arms 5 produces no effect; but when the collars 58 are pushed forward or rearward they effect a turning movement of the sleeve 52, which movement is transmitted through the springs 56 and the pins 54 to the disc 48 which, through the prongs 49, pushes the rollers 47 into one of the two end positions, so that now oscillating movement of the polygonal disc 43 actuated by the arms 5, causes the flange 45 and the gears 4 to revolve in one direction or the other, whereby rotary motion is imparted through the gear 3 to the shaft 2 in one direction or the other, according to the position of the shifting lever 67. When full speed is attained the two frames of the governor fly apart sufficiently far to cause the nut 23 to compress the springs 24 completely, and to pull the disc 22 into contact with the disc 10 fastened to the shaft 2, whereby a direct drive between the two shafts is established.

If the automatic control of the governor is not desired it is apparent that the governor could be easily dispensed with and manual control of the nut 19 substituted therefor, as for instance by means of lever similar to lever 67 engaging with the pins 31.

I claim:

1. In a transmission, a drive shaft having a disc thereon, a driven shaft alined with the drive shaft and having a disc at the confronting end thereof, a cage revolvable on the driven shaft and fixed to the disc on the drive shaft, a cam pivoted to the cage and movable on the driven shaft between concentric and eccentric positions, means operated by the cam for transmitting motion to the driven shaft, a threaded sleeve on the driven shaft and revolvable with the drive shaft and turnable relative thereto and having means for positioning the cam relative to the cage and the driven shaft, a nut movable on the sleeve and revolvable with the drive shaft, a governor pivoted to the cage and connected to the nut for effecting endwise movement thereof, a disc revolvable with the drive shaft and movable axially relative thereto and a connection between the nut and the latter disc whereby the latter disc may be drawn into frictional contact with the disc on the driven shaft when the nut is moved to its end position for effecting a direct drive between the shafts.

2. In a transmission, a drive shaft having a disc thereon, a driven shaft alined with the drive shaft, a cage revolvable on the driven shaft and fixed to the disc on the drive shaft, a cam pivoted to the cage and movable on the driven shaft between concentric and eccentric positions, means operated by the cam for transmitting motion to the driven shaft, a threaded sleeve on the driven shaft and revolvable with the drive shaft and turnable relative thereto, and having means for positioning the cam relative to the cage and the driven shaft, a nut movable on the sleeve and revolvable with the drive shaft and a governor pivoted to the cage and connected to the nut for effecting endwise movement thereof.

3. In a transmission, a drive shaft, a driven shaft alined therewith, a cage revolvable on the driven shaft and fixed relative to the drive shaft, a cam pivoted to the cage and movable on the driven shaft between concentric and eccentric positions, means operated by the cam for transmitting motion to the driven shaft, a threaded sleeve on the driven shaft and revolvable with the drive shaft and turnable relative thereto and having means for positioning the cam relative to the cage and the driven shaft, and a governor pivoted to the cage and having means for effecting turning movement of the sleeve relative to the drive shaft.

4. In a transmission, a drive shaft, a driven shaft alined therewith, a cage revolvable on the driven shaft and fixed relative to the drive shaft, a cam pivoted to the cage and movable on the driven shaft between concentric and eccentric positions, means operated by the cam for transmitting motion to the driven shaft, a threaded sleeve on the driven shaft and revolvable with the drive shaft and turnable relative thereto and having means for positioning the cam relative to the cage and the driven shaft, and means for effecting turning movement of the sleeve relative to the drive shaft.

5. In a transmission, a drive shaft having a disc thereon, a driven shaft alined with the drive shaft, a cage revolvable on the driven shaft and fixed to the disc on the drive shaft, a cam pivoted to the cage and movable on the driven shaft between concentric and eccentric positions, means operated by the cam for transmitting motion to the driven shaft, a threaded sleeve on the driven shaft and revolvable with the drive shaft and turnable relative thereto, and having means for positioning the cam relative to the cage and the driven shaft, a nut movable on the sleeve and revolvable with the drive shaft, and means for effecting endwise movement of the nut.

6. In a transmission, a drive shaft having a disc thereon, a driven shaft alined with the drive shaft and having a disc at the confronting end thereof, a cage revolvable on the driven shaft and fixed to the disc on the drive shaft, a cam pivoted to the cage and movable on the driven shaft between concentric and eccentric positions, means operated by the cam for transmitting motion to the driven shaft, means associated with the cage for positioning the cam relative to the cage and the driven shaft, said means including a disc revolvable with the drive shaft and movable axialy relative thereto and means for drawing the latter disc into frictional contact with the disc on the driven shaft when the cam reaches a predetermined position for effecting a direct drive between the shafts.

CHARLES R. BURROUGHS.